(12) United States Patent
Ernst

(10) Patent No.: US 6,263,608 B1
(45) Date of Patent: Jul. 24, 2001

(54) FISHING ROD ANCHOR

(76) Inventor: Loyd Ernst, 207 N. Jones, Drumright, OK (US) 74030

( * ) Notice: Subject to any disclaimer, the term of this patent is extended or adjusted under 35 U.S.C. 154(b) by 0 days.

(21) Appl. No.: 09/649,124

(22) Filed: Aug. 28, 2000

(51) Int. Cl.$^7$ ................................................ A01K 97/10
(52) U.S. Cl. ............................................ 43/21.2; 248/530
(58) Field of Search .................... 43/21.2; 248/530; D22/147

(56) References Cited

U.S. PATENT DOCUMENTS

| | | | |
|---|---|---|---|
| 2,137,645 | 11/1938 | Doench | 248/40 |
| 2,530,265 | 11/1950 | Phalen | 248/42 |
| 2,564,065 * | 8/1951 | Jaden | 248/530 |
| 4,007,902 * | 2/1977 | Pettee | 43/21.2 |
| 4,257,181 * | 3/1981 | Cooper | 43/21.2 |
| 4,372,072 | 2/1983 | Comeau | 43/21.2 |
| 4,807,384 * | 2/1989 | Roberts, Sr. | 43/17 |
| 4,877,165 | 10/1989 | Behrle | 224/42.45 R |
| 5,052,146 * | 10/1991 | Resnick | 43/21.2 |
| 5,557,876 * | 9/1996 | Parker | 43/21.2 |
| 5,560,137 * | 10/1996 | Herring | 43/21.2 |
| 5,625,974 | 5/1997 | Demaio | 43/21.2 |

* cited by examiner

Primary Examiner—Kurt Rowan
(74) Attorney, Agent, or Firm—Molly D. McKay

(57) ABSTRACT

A fishing rod anchor made of a single section of pipe for holding an unattended fishing pole at an angle relative to the ground. The pipe is hollow with one end cut so as to form a tapered point that can be inserted into the ground. The opposite end of the pipe is open to receive the handle of the rod and may optionally be provided with one or more cut out portions for allowing the user to set the hook without removing the rod from the anchor or to allow the anchor to accommodate rods with casting type reels.

2 Claims, 2 Drawing Sheets

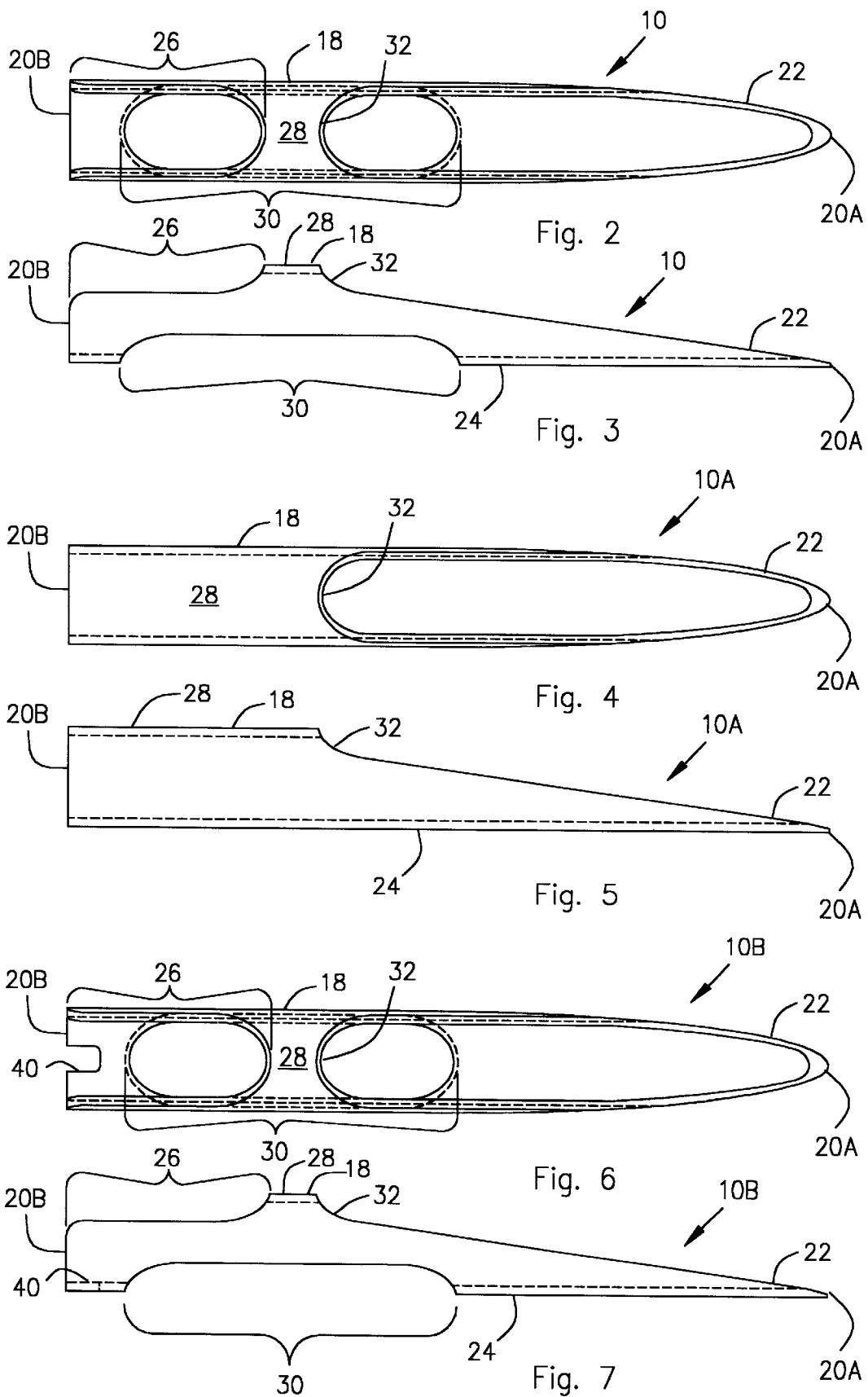

FISHING ROD ANCHOR

BACKGROUND OF THE INVENTION

1. Field of the Invention

The present invention relates to a fishing rod anchor made of a single section of pipe for holding an unattended fishing pole at an acute angle relative to the ground. The pipe is hollow with one end cut so as to form a tapered point that can be inserted into the ground. The opposite end of the pipe is open to receive the handle of the rod and may optionally be provided with one or more cut out portions to accommodate different rod handles and allow the user to set the hook without removing the rod from the anchor.

2. Description of the Related Art

Various types of devices have been proposed for holding a fishing rod at an angle to the ground when the fishing rod is being used but is unattended.

Some of the problems with previous devices are that they accommodate fewer types of rod handles, there is not enough stability at the ground anchor, there is no provisions for driving the anchor into the ground, some deteriorate in salt water, and some are not strong enough to hold large fish.

This invention offers tremendous improvements in these specific problem areas. Specifically, these rod holders will accommodate both spinning and casting rod handles. The pointed end of the anchor is cupped which prevents the anchor from twisting in the ground. The upper end of the anchor provides a flat spot to use to drive the anchor into the ground. Anchors made of plastic resist most deterioration. And when the anchor is properly installed, the line, reel, or rod will break before the anchor gives way.

SUMMARY OF THE INVENTION

The present invention is a fishing rod anchor made of a single section of pipe for holding an unattended fishing pole at an acute angle relative to the ground. The fishing rod anchor is preferably constructed of plastic or any material desired that is suitable for making the rod anchor.

The pipe is hollow with one end cut so as to form a tapered point that can be inserted into the ground. The opposite end of the pipe is open to receive the handle of the rod.

Optionally, the handle receiving end of the pipe may be provided with a cut out portion on a side of the pipe opposite the tapered point, and the pipe may provided with a second cut out portion on the same side as the tapered point and located on the handle receiving end of the anchor. Together these two cut out portions allow the user to jerk the tip of the pole to a vertical position without removing the handle of the rod from the anchor. This is desirable in order to set the hook into a fish.

Also, the pipe may optionally be provided with an additional or third cut out portion at the handle-receiving end of the pipe to allow the anchor to accommodate a casting type rod.

BRIEF DESCRIPTION OF THE DRAWINGS

FIG. 2 is rear view of a fishing rod anchor constructed in accordance with a preferred embodiment of the present invention.

FIG. 3 is a right side view of the fishing rod anchor of FIG. 1.

FIG. 4 is a rear view of an alternate embodiment fishing rod anchor.

FIG. 5 is a right side view of the fishing rod anchor of FIG. 4.

FIG. 6 is a rear view of a second alternate embodiment fishing rod anchor.

FIG. 7 is a right side view of the fishing rod anchor of FIG. 6.

DETAILED DESCRIPTION OF THE PREFERRED EMBODIMENT

Fishing Rod Anchor

Figure 1:
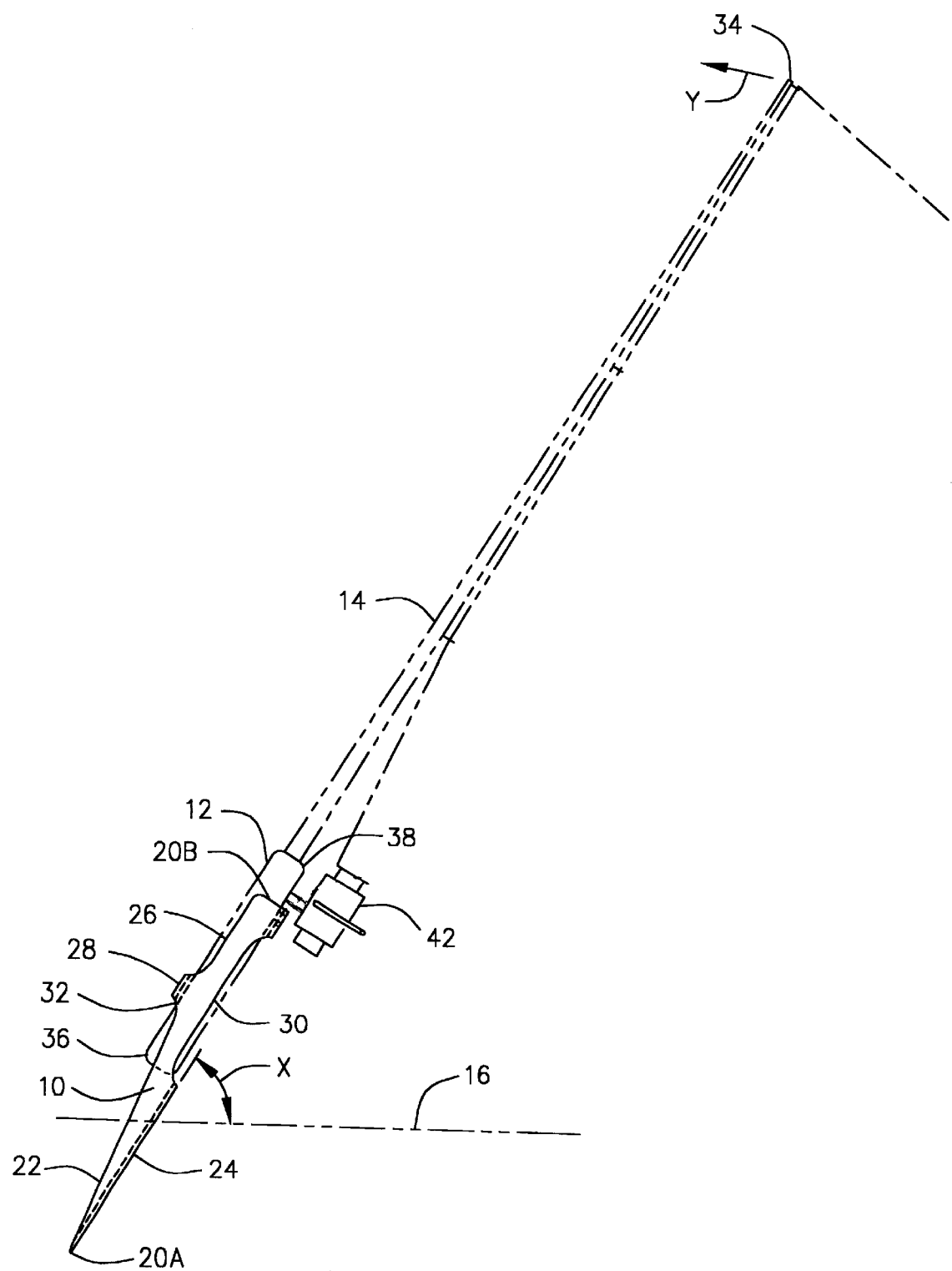
FIG. 1 is a right side view of a fishing rod anchor constructed according to one embodiment of the present invention that is being used to secure a fishing rod to the ground.

Referring now to FIGS. 1, 2 and 3, there is illustrated a fishing rod anchor 10 constructed in accordance with a preferred embodiment of the present invention. An alternate embodiment 10A of the invention is illustrated in FIGS. 4 and 5, and a second alternate embodiment 10B of the invention is illustrated in FIGS. 6 and 7.

Referring now to FIG. 1, the function of the anchors 10, 10A and 10B will be described. The fishing rod anchor 10, 10A and 10B is preferably constructed of rigid plastic pipe, such as for example PVC pipe, although the invention is not so limited and can be constructed of other suitable materials.

The anchor 10 is shown in FIG. 1 holding a handle 12 of an unattended fishing rod 14 at an acute angle X relative to the ground 16. Each of the anchors 10, 10A or 10B is constructed of a single section or length of pipe 18. The pipe 18 is hollow between its two ends 20A and 20B. The pipe 18 must be hollow so that it can receive the handle 12 of the rod 14 which inserts inside the pipe 18 via the open second end 20B. The first end 20A is cut so as to form a tapered point 22 that can be inserted into the ground 16 at angle X to the ground 16, as illustrated in FIG. 1. FIGS. 4 and 5 illustrate an alternate embodiment of the invention 10A that conforms to the invention as described thus far. This embodiment 10A is the simplest form of the present invention and functions to hold the rod 14 without any further modifications to the anchor 10A.

Now referring to FIGS. 1, 2 and 3, the preferred embodiment of the present invention 10 will be described. This description also applies to the second embodiment 10B. As shown, the tapered point 22 is preferably located on the front side 24 of the anchor 10 or 10B. The anchor 10 or 10B is provided with a first cut out portion 26 on an opposite rear side 28 of the anchor 10 or 10B. The first cut out portion 26 is located at the handle-receiving end 20B and is in the shape of a half oval.

The anchor 10 or 10B is also provided with a second cut out portion 30 on the front side 24 and located intermediate between the two ends 20A and 20B. The second cut out portion 30 is in the shape of an oval, and when the anchor 10 or 10B is viewed from the rear, as illustrated in FIGS. 2 and 6, the second cut out portion 30 overlaps the first cut out portion 26 longitudinally without the two cut out portions 26 and 30 intersecting. Also, as viewed from the rear, the second cut out portion 30 overlaps an oval upper portion 32 of the pointed end 20A that was formed when the tapered point 22 was formed. The oval upper portion 32 of the pointed end 20A is believed to be beneficial to the function of the anchor 10, 10A or 10B in holding the handle 12 and stabilizing the anchor 10, 10A or 10B. When a fish pulls down on the rod 14, the handle 12 becomes lodged in the oval upper portion 32 so that the handle 12 will not come out of the anchor 10, 10A or 10B even though the fish may swim in a 180 degree arc around the rod 14 and the anchor 10, 10A or 10B. The oval upper portion 32 helps to stabilize the rod 14.

As illustrated by Arrow Y, together these two cut out portions 26 and 30 allow the user to raise a tip 34 of the rod 14 to a vertical position or toward the user, i.e. in the direction of the rear side 28 of the anchor 10 or 10B, in order to set the hook in the mouth of a fish when the fish is nibbling at a baited hook that is attached to a fishing line that is provided in association with the fishing rod 14. As the user raises the rod's tip 34 toward the user, the distal end 36 of the handle 12 is pulled out through the second cut out portion 30 and the proximal end 38 of the handle, i.e. the end of the handle 12 on which the rod 14 attaches, is pulled out through the first cut out portion. This results in the rod 14 pivoting within the anchor 10 or 10B without removing the handle 12 of the rod 14 from the anchor 10 or 10B. As illustrated in FIG. 1, a rod 14 with a spinner type reel 42 is received within the anchor 10.

Also, as illustrated in FIGS. 6 and 7, the anchor 10B optionally is provided with an additional third cut out portion 40 on the front side 24 at the handle-receiving end 20B of the anchor 10B to allow the anchor 10B to accommodate an ear that is provided on a rod that employs a casting type reel (not illustrated).

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A fishing rod anchor for securing an unattended fishing rod in the ground comprising:

a hollow pipe with a tapered first end on a front side of the pipe for inserting into the ground and a second open end of the pipe for receiving a handle of a fishing rod within the pipe, said tapered first end being of a length sufficient that an upper portion of the tapered first end extends above the ground on a rear side of the pipe and engages a handle of a fishing rod that inserts into the second open end of the pipe in order to prevent the fishing rod from being released from the pipe when the fishing rod is pulled forward or sideways, a rear side of the pipe provided with a first cut out portion located at the second end of the pipe and communicating through the pipe, and said front side of the pipe provided with a second cut out portion located intermediate between the first and second ends of the pipe and communicating through the pipe, said second cut out portion overlapping longitudinally both said first cut out portion and said tapered first end.

2. A fishing rod anchor according to claim 1 further comprising:

said front side of the pipe provided with a third cut out portion located at the second end of the pipe and communicating through the pipe to receive a casting type rod therein.

* * * * *